United States Patent [19]
Yoshizumi et al.

[11] 3,830,999
[45] Aug. 20, 1974

[54] METHOD OF WELDING, FUSING OR HEATING WORKPIECE UTILIZING ENERGY OF LIGHT

[75] Inventors: Shuzo Yoshizumi, Takarazuka; Takao Doe, Toyonaka; Takeshi Oku, Kawanishi; Yoshimitsu Matsumoto, Toyonaka, all of Japan

[73] Assignee: Matsushita Electric Industrial Co., Ltd., Osaka, Japan

[22] Filed: Nov. 7, 1972

[21] Appl. No.: 304,468

[30] Foreign Application Priority Data
Nov. 10, 1971 Japan.............................. 46-90188

[52] U.S. Cl.................................. 219/137, 219/347
[51] Int. Cl............................................. B23k 9/00
[58] Field of Search.......... 219/137, 85, 121 L, 347, 219/349; 314/20; 240/41.35 R

[56] References Cited
UNITED STATES PATENTS
3,621,198  11/1971  Herbrich............................ 219/349

*Primary Examiner*—C. L. Albritton
*Attorney, Agent, or Firm*—Stevens, Davis, Miller & Mosher

[57] ABSTRACT

A method of welding, fusing or heating a workpiece by concentrating light emitted from an arc lamp as a heat source by an elliptical reflector in which the ratio between the second and first focal lengths of the reflecting mirror is selected to be smaller than eight and the depth of the reflector is selected to be greater than the first focal length.

2 Claims, 6 Drawing Figures

METHOD OF WELDING, FUSING OR HEATING WORKPIECE UTILIZING ENERGY OF LIGHT

This invention relates to a method of welding, fusing, or heating workpieces utilizing the energy of light.

Impurities are inevitably included in welds formed by conventional methods of welding such as arc welding due to the fact that the surface layer of workpieces is generally directly heated by the heat emitted from the source of energy. Further, it is generally extremely difficult to apply such a conventional welding method to workpieces having a thickness less than 0.1 mm due to the fact that the workpieces are fused over a large area. In an effort to prevent undesirable inclusion of impurities in the fused area, a method utilizing the energy of light emitted from a light source has been proposed. However, it is difficult with such a method to obtain a stable and sound weld because of the fact that the surface layer of workpieces is melted excessively and therefore severe conditions are required for the welding speed and the method of fixing the workpieces. Further, this proposed welding method is not practically advantageous over the conventional welding methods in that the shape and thickness of workpieces are limited due to the instability of the results of welding. In the field of partial fusion of workpieces too, it has been attempted to utilize the energy of light emitted from a light source in order to obtain a fused zone of high purity. However, this method is applicable only to the fusion of the surface layer of workpieces and is difficult to attain satisfactory fusion due to the fact that unnecessary portions are also fused as the fusing of the deep penetration into the workpieces.

It is therefore a primary object of the present invention to obviate prior art defects as above described and to provide a novel and improved method which is capable of carrying out stable and reliable welding on workpieces, which provides the possibility of welding in the scope of welding applications within which it has been difficult to attain desired welding, and which is capable of carrying out reliable and satisfactory fusion of workpieces.

The inventors have made various tests in an effort to attain the above object and have found that the above object can be attained when all the conditions described later are satisfied. This invention is broadly directed to a method of welding, fusing or heating a workpiece utilizing light energy and includes the steps of placing an arc lamp as a heat and light source at a first focus of an elliptical reflector, placing the workpiece at a second focus of the reflector, and concentrating the light emitted from the arc lamp by the elliptical reflector for directing the emitted light to the workpiece to thereby weld, fuse or heat it, and wherein the ratio $b/a$ between the second focal length $b$ and the first focal length $a$ of the elliptical reflector is smaller than a predetermined threshold value, the depth of the elliptical reflector being greater than this predetermined value.

The above and other objects, features and advantages of the present invention will be apparent from the following detailed description taken in conjunction with the accompanying drawing, in which.

Figure 1:
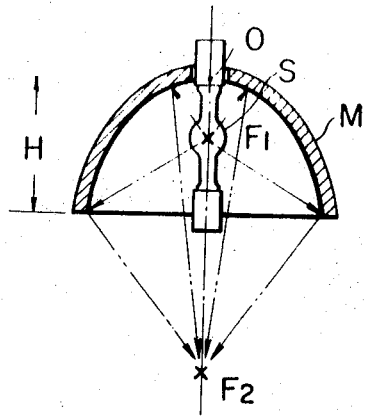
FIG. 1 is a schematic view showing the arrangement of means preferably used for the practice of a method according to the present invention.
Figure 2:
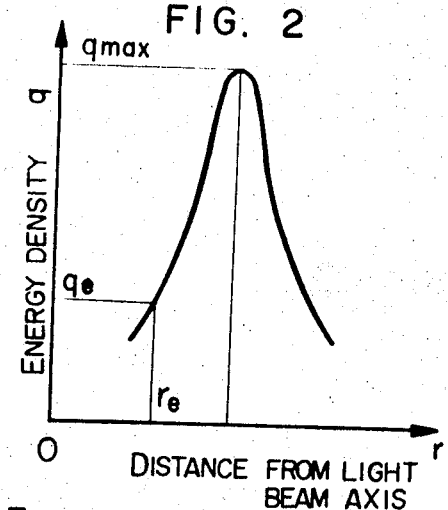
FIG. 2 is a graph showing the energy distribution in the present invention.
Figure 3:
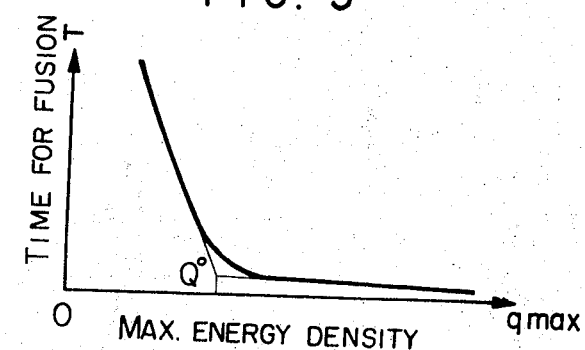
FIG. 3 is a graph showing the relation between the maximum energy density $q_{max}$ and the period of time T required for fusion.
Figure 4:
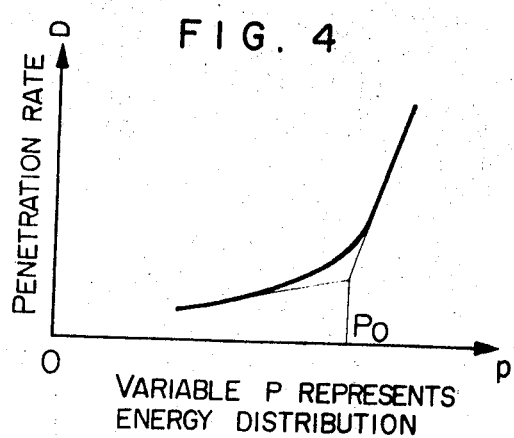
FIG. 4 is a graph showing the relation between the rate of penetration D and a variable P representing the mode of energy distribution.

Referring to FIG. 1, an arc lamp as a heat source S is disposed at a first focus F1 of a elliptical reflector M so that the energy of light emitted from the light source S can be concentrated on a workpiece disposed at a second focus F2 of the elliptical reflector M thereby satisfactorily welding and fusing the zone of the workpiece at and in the vicinity of the second focus F2. The light beam which is emitted from the light source S and concentrated by elliptical reflector has an energy distribution quite analogous to the Gaussion distribution as seen in FIG. 2. The relation between the maximum energy density $q_{max}$ in such an energy distribution and the period of time T required for fusing a predetermined quantity of the workpice is experimentally determined and illustrated in FIG. 3. It will be seen from FIG. 3 that there is a threshold value Q: of the maximum energy density $q_{max}$ which is dependent upon the material of the workpiece, and that the period of time required for fusing the specific zone of the workpiece can be remarkably reduced to the advantage of the working only when the energy is concentrated at a level higher than the level of the threshold value Q:

Consider now the energy distribution range in which the maximum energy density $q_{max}$ is greater than the threshold value Q: Referring to FIG. 2, represents the distance from the axis of light beam to the position where the maximum energy density $q°_{max}$ in the energy distribution range above described is decreased to an energy density $q_e$ which is $1/e$ of the maximum value $q°_{max}$. A variable P given by $P = q°_{max}/\gamma e$ is taken herein to represent the mode of such energy distribution. The relation between the variable P and the rate of penetration D is experimentally determined and illustrated in FIG. 4. The rate of peneration D is given by $D = d/h$ which is the ratio between the width $h$ of the fused zone at the workpiece surface on which the energy is concentrated and the depth $d$ of the fused zone of the workpiece. It will be seen from FIG. 4 that the variable P includes a threshold value Po given by $Po = 1.0 - 2.0 \times 10^3$ W/cm² · 1/cm. Stable and satisfactory welding free from prior art defects can be carried out when the energy is concentrated in such a manner that the variable P is greater than the threshold value Po. Various tests carried out in an effort to obtain an energy distribution as above described have proved that the focal length ratio $b/a$ between the first and second focal lengths $a$ and $b$ of the elliptical reflector M must be selected to lie in a range which will be described below.

Figure 5:
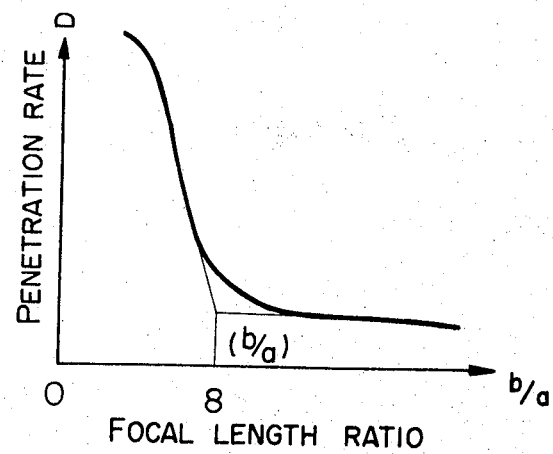
FIG. 5 is a graph showing the relation between the rate of penetration D and the focal length ratio $b/a$ of a elliptical reflector.

FIG. 5 shows the relation between the focal length ratio $b/a$ and the rate of penetration $D = d/h$ determined by the tests. It will be seen from FIG. 5 that the focal length ratio $b/a$ relative to the rate of penetration D includes a threshold value $(b/a)o = 8$. It will thus be seen that the energy distribution advantageous for desired working can be obtained and satisfactory working free from the defects of the prior art method utilizing the energy of light can be attained when the focal length ratio $b/a$ of the elliptical reflecting mirror M is selected to be smaller than the threshold value $(b/a)o = 8$.

Figure 6:
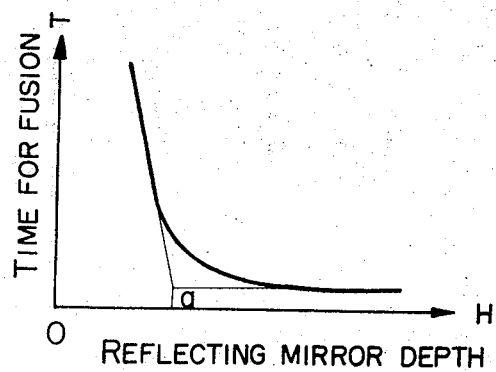
FIG. 6 is a graph showing the relation between the depth H of the elliptical reflector and the period of time T required for fusion.

The relation between the depth H of the elliptical reflector M and the period of time required for fusing a predetermined quantity of the workpiece is experimentally determined and illustrated in FIG. 6. The term "depth H" is used herein to represent the distance which ranges from the opening edge of the reflector mirror M to the intersection O between the reflector M and the light beam axis and which is parallel with the light beam axis as shown in FIG. 1. It will be seen from FIG. 6 that an excessively long period of time is required for fusion when the depth H of the elliptical reflector M is smaller than the first focal length a of the elliptical reflector M. It will thus be seen that the depth H of the reflector mirror M should be at least greater than the first focal length a of the reflector M in order to attain efficient working.

The objects of the present invention can be attained when all the essential conditions above described are satisfied. The method of the present invention provides the following advantages:

1. The method of welding according to the present invention is advantageous over the prior art welding method of similar kind in that zones to be welded can be fused within a very short period of time and the maximum welding speed can be increased to several times that of the prior art maximum rate by virtue of the greater rate of penetration.
2. For similar reasons, the allowable ranges of the welding conditions including the welding speed and the method of fixing workpieces can be remarkably widened and stable and reliable welding can be ensured.
3. By virtue of the capability of stable welding, thin workpieces having thickness of less than 0.1 mm which have been difficult to be welded by the prior art method can be easily, satisfactorily and reliably welded, and thus, the weldable range can be remarkably widened.
4. The method of fusing according to the present invention is advantageous over the prior art fusing method of similar kind in that the speed of fusion can be remarkably increased and workpieces can be fused to a deep portion by virtue of the fact that the rate of penetration is greater than heretofore and the desired workpieces portions can be fused within a very short period of time.
5. According to the method of the present invention, workpieces can be heated at a speed which will not fuse the workpieces. Further, heating can be efficiently carried out by virtue of the fact that the workpieces can be heated at a remarkably rapid rate and the heating can be limited to a narrow zone as in the welding and fusing.

What is claimed is:

1. A method of welding, fusing or heating a workpiece utilizing the energy of light, comprising: disposing an arc lamp as a heat source at or in the vicinity of a first focus of an elliptical reflector, disposing the workpiece at or in the vicinity of a second focus of said elliptical reflector, and concentrating the light emitted from said arc lamp as a heat source by said elliptical reflector for directing such light to the workpiece, thereby welding, fusing or heating the workpiece, wherein the ratio $b/a$ between the second focal length $b$ and the first focal length $a$ of said elliptical reflector is selected to be less than 8, and the depth of said elliptical reflector is selected to be greater than a predetermined value for optimum heating of the workpiece.

2. A method as claimed in claim 1, wherein the depth of the elliptical reflector is greater than the first focal length a of the elliptical reflector.

* * * * *